(12) United States Patent
Yang et al.

(10) Patent No.: US 8,562,483 B2
(45) Date of Patent: Oct. 22, 2013

(54) METHOD AND SYSTEM FOR CONTROLLING AN EV MODE TRANSITION IN A TWO-MODE HYBRID VEHICLE

(75) Inventors: Hong Yang, Rochester Hills, MI (US); Anthony L. Smith, Troy, MI (US); Shawn H. Swales, Canton, MI (US); James D. Hendrickson, Oxford, MI (US); Brendan M. Conlon, Rochester Hills, MI (US); Jy-Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 490 days.

(21) Appl. No.: 12/974,060

(22) Filed: Dec. 21, 2010

(65) Prior Publication Data
US 2012/0083951 A1    Apr. 5, 2012

Related U.S. Application Data

(60) Provisional application No. 61/388,129, filed on Sep. 30, 2010.

(51) Int. Cl.
*B60W 10/06* (2006.01)
*B60W 10/08* (2006.01)
*F16H 3/72* (2006.01)

(52) U.S. Cl.
USPC .................................. 477/4; 475/5; 475/900

(58) Field of Classification Search
USPC ........................................ 477/4, 203; 475/900
See application file for complete search history.

(56) References Cited

U.S. PATENT DOCUMENTS

| | | | |
|---|---|---|---|
| 5,951,433 A * | 9/1999 | Tsukamoto et al. | 475/281 |
| 7,578,765 B2 * | 8/2009 | Tabata et al. | 477/5 |
| 2010/0273594 A1 * | 10/2010 | Sung | 475/5 |

* cited by examiner

*Primary Examiner* — Edwin A Young
(74) *Attorney, Agent, or Firm* — Quinn Law Group, PLLC

(57) ABSTRACT

A method of executing an electric-only (EV) mode transition in a vehicle includes determining vehicle operating values using a control system, processing the values to identify the transition, and executing the transition to or from the first or second EV mode. The transition is executed by selectively engaging and disengaging the input brake to zero, and by using the first and/or second traction motor to synchronize slip across the input brake. When the transition is from the first to the second EV mode or vice versa, the control system may use multiple speed and torque control phases to enter multiple intermediate modes, e.g., a pair of engine-on electrically-variable transmission modes and a fixed gear mode. A vehicle includes an engine, an input brake, first and second traction motors, and a transmission driven via the motors in a first and second EV mode. The vehicle includes the control system noted above.

18 Claims, 2 Drawing Sheets

METHOD AND SYSTEM FOR CONTROLLING AN EV MODE TRANSITION IN A TWO-MODE HYBRID VEHICLE

CROSS-REFERENCE TO RELATED APPLICATIONS

This application claims priority to and the benefit of U.S. Provisional Patent Application Ser. No. 61/388,129, which was filed on Sep. 30, 2010, and which is hereby incorporated by reference in its entirety.

TECHNICAL FIELD

The present invention relates to a method and a system for controlling an electric-only vehicle (EV) mode transition in a two-mode hybrid electric vehicle.

BACKGROUND

Certain vehicles can be driven using electrical power from one or more electric traction motors. For example, hybrid electric vehicles can selectively disconnect an internal combustion engine to allow vehicle propulsion in an electric-only/electric vehicle (EV) operating mode in order to conserve fuel, as well as to deliver immediate motor input torque to the transmission. A two-mode hybrid electric vehicle has a pair of EV modes to further optimize vehicle performance, as well as various fixed gear and electrically-variable transmission (EVT) modes.

In a strong hybrid design, the engine can be automatically restarted above a threshold speed, with engine torque used alone or in conjunction with motor torque from either or both of a pair of high-voltage electric traction motors to propel the vehicle. Other vehicle designs such as battery electric vehicles and extended-range electric vehicles also utilize EV operating modes to maximize fuel economy and minimize tailpipe emissions.

A vehicle with an EVT can be driven via a fraction motor when the engine is at zero speed (i.e., electrical drive), or the engine can be spinning while connected to the output with the vehicle at zero speed (i.e., engine-on launch), or anywhere in between. Typically, multiple hydraulically-actuated range clutches are used to allow shifting or transitioning between continuously-variable modes, hereinafter referred to as EVT modes, and multiple fixed-gear modes. In an input-split or series-parallel architecture, one traction motor may propel the vehicle while the other traction motor maintains the engine at zero speed. This helps to avoid losses from engine friction and pumping. However, single-motor electrical propulsion has limited electric launch and acceleration capabilities relative to the two-motor design of a two-mode hybrid electric vehicle.

SUMMARY

A method and a control system are provided herein for use in a two-mode hybrid electric vehicle having a pair of electric traction motors and an input brake. The input brake is added to the two-mode architecture to take full advantage of the potential capabilities of the two-mode system. The method is automatically executed via the control system, which may be configured as a single or a distributed control system, in order to optimize transition/shift quality during a predetermined electric vehicle (EV) mode transition.

As used herein, the term "EV mode transition" refers to a state or operating mode transition to an EV operating mode from another EV operating mode, or from an engine-on/continuously variable (EVT) mode. The term "EV mode transition" can also refer to a transition from an EV operating mode to another EV operating mode or to an engine-on/EVT operating mode. The present method thus enables the EV mode transition to occur with an optimal shift quality by controlling the input brake and transmission input speeds/torques in the manner set forth herein.

In particular, a method of executing an EV mode transition in a vehicle includes determining a set of vehicle operating values prior to the EV mode transition using a control system, processing the vehicle operating values to thereby identify when the transition is imminent, and executing a transition to or from a first or second EV operating mode as the EV mode transition. Executing the transition may include selectively engaging and disengaging the input brake, and using at least one of the first and the second traction motors to synchronize the amount of slip across the input brake to zero during the transition, as well as by using the first and/or the second traction motor to off-load the input brake before the input brake is engaged or disengaged.

When the EV transition is between the two EV modes, the method includes transitioning between the two EV modes through multiple speed and torque control phases to thereby enter multiple intermediate modes, e.g., a pair of electrically-variable transmission (EVT) modes and a fixed gear mode.

The transition from an EV mode to a fixed gear state includes an EV transition from an EV mode to an EVT mode, and then to the fixed gear state. Likewise, the transition to the EV mode from a fixed gear state includes transitioning from the fixed gear state to the EVT mode, and then from the EVT mode to the EV mode.

The above features and advantages, and other features and advantages of the present invention are readily apparent from the following detailed description of the best modes for carrying out the invention when taken in connection with the accompanying drawings.

DETAILED DESCRIPTION

Figure 1:
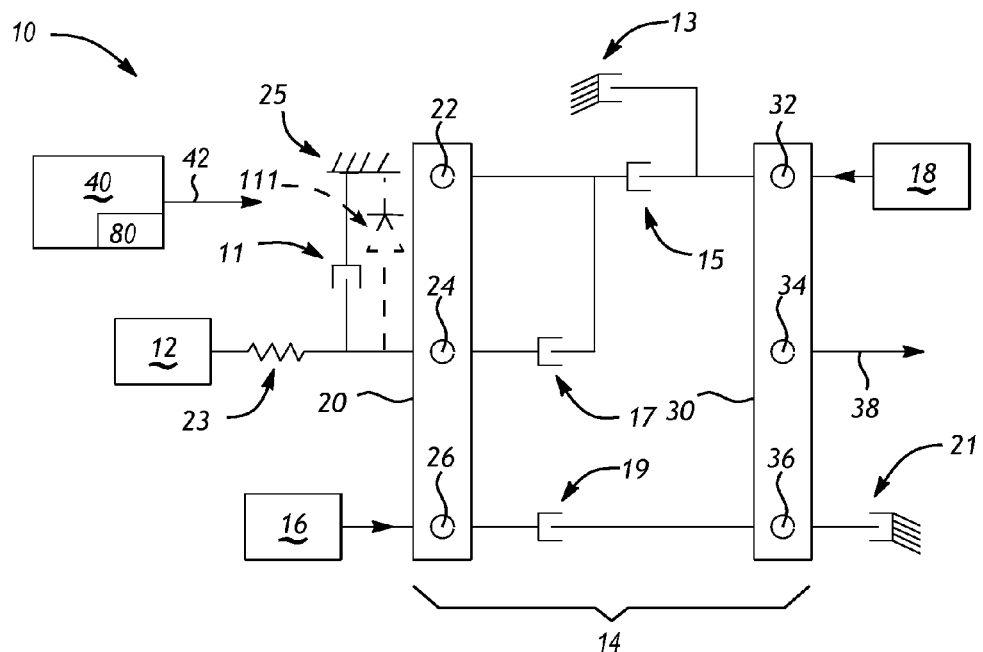
FIG. 1 is a schematic illustration of a two-mode hybrid vehicle having a system for controlling various electric-only (EV) mode transitions.

A vehicle 10 is shown in FIG. 1. The vehicle 10 may be configured as a two-mode/strong hybrid vehicle having an internal combustion engine 12, which may be selectively connected to a transmission 14 via a clutch and damper assembly 23. The engine 12 can be used to selectively power the vehicle 10, and can be selectively shut off as needed to allow the vehicle to be propelled in an electric vehicle (EV)

state or operating mode. As a two-mode hybrid, the vehicle 10 has a pair of different engine-off EV modes, referred to herein as EV1 and EV2 for clarity. The vehicle 10 also has a pair of continuously variable (EVT) modes, i.e., EVT1 and EVT2, with EVT1 covering a higher speed ratio range than EVT2. Additionally, the vehicle 10 includes four fixed gear modes, i.e., FG1, 2, 3, and 4, that are achieved by simultaneously locking two range clutches as noted below. The second fixed gear, FG2, is located at the ratio of the synchronous transition point between EVT1 and EVT2, and is used as an intermediate or transitional mode during an EV transition as explained below.

Mode shifts or transitions to or from either of the EV modes (EV1 or EV2) to any other mode can be determined by a control system 40, with the transition executed according to the present method 80 described with reference to FIG. 2. The method 80 may be executed automatically by associated hardware and software components of the control system 40 to determine the present mode and commanded mode, and to select from various transition methods 100-600 as explained below with reference to FIGS. 3-8. The control system 40 controls various elements of the vehicle 10 through different speed and torque control phases. As understood in the art, a speed control phase involves controlling input speed, e.g., from the engine 12, until synchronization is achieved across a designated clutch. The torque control phase involves a torque transfer from an off-going clutch to an oncoming clutch while maintaining synchronization of the clutches.

The control system 40 is configured to selectively execute the method 80 via a set of control signals (arrow 42). The set of control signals (arrow 42) represents automated speed and torque control commands during the speed and torque control phases of mode transition control, which are transmitted to the various powertrain components affected during a particular mode transition. Such powertrain components include a transmission 14, which is shown here in lever diagram form for illustrative clarity. One possible embodiment of the transmission 14 includes a respective first and a second planetary gear set 20 and 30. The first planetary gear set 20 may have three nodes 22, 24, and 26 as shown. Likewise, the second planetary gear set 30 may have three nodes 32, 34, and 36.

The transmission 14 of FIG. 1 has three braking clutches, including an input brake 11, a first brake 13, and a second brake 21. The input brake 11 may be an actively-actuated friction braking device, or it may be alternatively configured as a passively-actuated one-way clutch 111, i.e., a passive freewheel device that holds torque in one direction and rotates freely in the other direction, as described below. All of the braking clutches selectively connect designated members of the transmission 14 to a stationary member 25.

The transmission 14 also has three rotating clutches, i.e., first, second, and third clutches 15, 17, and 19, respectively, with clutch 19 selectively connecting node 26 of the first planetary gear set 20 to node 36 of the second planetary gear set 30 as shown. The input brake 11 brakes rotation of the engine 12 at node 24 of the first planetary gear set 20, with the input brake being the primary clutch controlled via the method 80 during the EV mode transition.

Still referring to FIG. 1, a respective first and a second electric traction motor 16 and 18 drive the planetary gear sets 20 and 30, respectively, during EV1 and EV2, as well as in two engine-on EVT modes, i.e., EVT1 and EVT2. As shown, the first traction motor 16 may be connected to node 26, e.g., a sun gear, and the traction motor 18 may be connected to node 32, which may also be a sun gear in the same embodiment. The motors 16, 18 may be multi-phase high-voltage induction or permanent magnet electric machines rated for approximately 60VDC to 300VDC or more depending on the vehicle design. A transmission output member 38 is connected to node 34 of the second planetary gear set 30, e.g., a carrier member, with output torque transmitted to a set of drive wheels (not shown) via the output member. The arrow of output member 38 is intended to indicate the direction of output torque toward the drive wheels of the vehicle 10, with the wheels omitted from FIG. 1 for simplicity.

As noted above, the vehicle 10 can be configured as a two-mode hybrid electric vehicle having two different EV modes, or EV1 and EV2. EV1 is entered with the engine 12 turned off/not fueled, and with the input brake 11 fully engaged. The transmission 14 is in a first electric-only mode (EV1), with the input brake 11 and the second brake 21 both engaged. The first clutch 15 is applied in either EV mode. With the input brake 11 engaged and thus providing sufficient reaction torque at the first planetary gear set 20, both of the fraction motors 16 and 18 can provide positive propulsion or negative regenerative braking torque as needed.

In EV2, the engine 12 remains off and the input brake 11 remains fully engaged. In this second EV mode (EV2), the third clutch 19 is engaged. As with EV1, both traction motors 16 and 18 can provide positive propulsion or negative regenerative braking torque in EV2.

The control system 40 of FIG. 1 can include one or more digital computers acting as host machines or servers, each having a microprocessor or central processing unit, sufficient read only memory (ROM), random access memory (RAM), electrically-programmable read only memory (EPROM), a high-speed clock, analog-to-digital (A/D) and digital-to-analog (D/A) circuitry, and input/output circuitry and devices (I/O), as well as appropriate signal conditioning and buffer circuitry. The control system 40 may include any required control modules or processors, such as but not limited to any processors required for motor control, top-level hybrid control, engine control, braking control, etc.

Each set of algorithms or code resident in the control system 40 or readily accessible thereby, including any algorithms or computer code needed for executing the present method 80 and any of the mode transition methods 100-600 as explained below with reference to FIGS. 2-8, can be stored in non-transitory or tangible memory as a set of computer-executable instructions or code, and executed as needed by the host machine or other hardware components of the control system 40 to provide the respective functionality of each resident control module.

Figures 2, 3, 4:
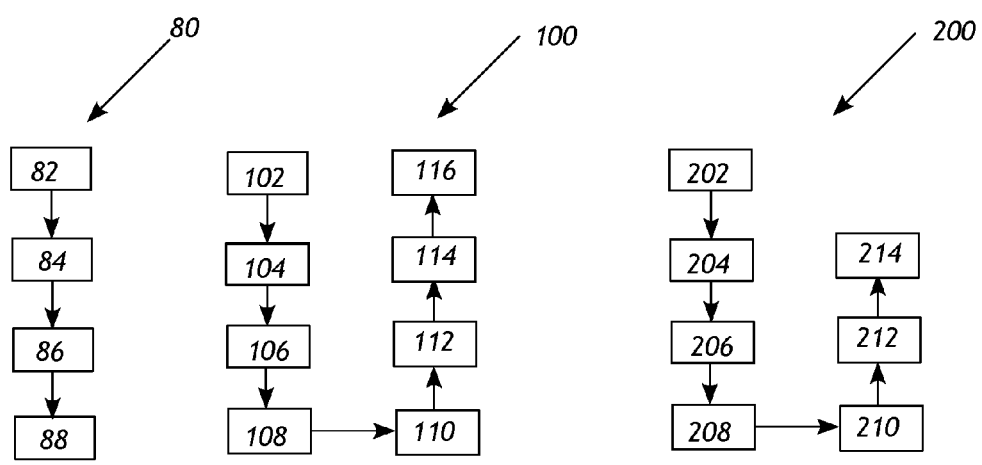
FIG. 2 is a flow chart describing a method for controlling EV mode transitions in the vehicle shown in FIG. 1.
FIG. 3 is a flow chart describing an EV-to-EV mode transition executable via the method of FIG. 2.
FIG. 4 is a flow chart describing another EV-to-EV mode transition.

Referring to FIG. 2, the present method 80 progresses in a few broad steps to determine, at step 82, the vehicle operating values needed for identifying the present operating mode, the requested operating mode, and the required transition method for reaching the requested operating mode. Step 82 may include determining the present vehicle speed, e.g., using wheel speed or transmission output speed sensors (not shown), and/or by calculating the requested output torque by processing driver input such as throttle level, braking signals, etc. Once the required vehicle operating values are determined, the method 80 proceeds to step 84.

At step 84, the control system 40 determines the present transmission operating mode, i.e., the mode or state of the transmission 14, which may be accomplished using any suitable means. For example, the control system 40 may reference a hybrid control processor, motor control processor, and/or any other vehicle control modules, whether resident within the control system 40 or separate therefrom, to determine the present transmission operating mode. Once determined, the method 80 proceeds to step 86.

At step 86, the control system 40 processes the information from steps 82 and 84 and selects a requested transmission operating mode. This is the mode to which the control system 40 will transition at step 88. At step 86, the control system 40 selects a sub-routine or state transition method from the various methods 100-600 described below, and proceeds to step 88.

At step 88, the control system 40 executes the selected state transition method from step 86, and then returns to step 82. Each of the state or EV mode transitions will now be described with reference to FIGS. 3-8.

Referring to FIG. 3, a method 100 is provided for executing a first EV mode transition, that being an EV-to-EV state transition in which the control system 40 transitions from EV1 to EV2. For example, such a transition may occur in the vehicle 10 of FIG. 1 at approximately 0.15 g of acceleration and a vehicle speed of 25 mph/40 kph. This particular EV mode transition progresses in eight stages, and can be explained with reference to the structure shown in FIG. 1.

Beginning at step 102, stage 1 includes using the control system 40 to ramp the output torque from the fraction motor 16 to zero, and then unloads the input clutch 11. Step 102 may include applying a calibrated ramp-down rate to the traction motor 16 until the output torque from the motor 16 is less than a calibrated threshold, e.g., approximately 0.5 Nm in one possible embodiment. The method 100 proceeds to step 104 when the output torque drops below the calibrated threshold.

At step 104, or stage 2, the input brake 11 is released or disengaged. The vehicle 10 is now in a state wherein the engine 12 is off and not fueled, and the traction motor 16 is operating per its torque control phase. The method 100 proceeds to step 106.

At step 106, or stage 3, the control system 40 synchronizes the speed of motor 16 to zero. This can entail synchronizing the third clutch 19 until the slip speed across the third clutch is approximately zero, i.e., less than a calibrated low slip speed limit. The transmission 14 in the EVT1 state, and the engine 12 is started but not fueled during the speed phase of synchronizing the speed of traction motor 16 to zero. The method 100 proceeds to step 108 once the transmission 14 is in EVT1.

At step 108, or stage 4, the control system 40 engages the third clutch 19 to place the transmission 14 in a predetermined fixed gear mode, e.g., second gear or FG2. This mode forms a transitional gear state for the EV mode transition. With the third clutch 19 fully engaged, the method 100 proceeds to step 110.

At step 110, or stage 5, the second brake 21 is released and unloaded using torque from traction motor 16. With the second brake 21 disengaged and the third clutch 19 engaged, the speed control phase is executed on the traction motor 16 and the traction motor 18. With this in process, the method 100 proceeds to step 112.

At step 112, or stage 6, the transmission 14 is in an additional engine-on operating mode, EVT2, at a desired engine speed. Engine speed and transmission input speed is then synchronized to zero using a calibrated speed profile for the input brake 11, thereby controlling initial and end acceleration. The absolute value of any clutch slip across the input brake 11 can be held below a low threshold slip limit, e.g. below approximately 20 RPM in one possible embodiment.

At step 114, or stage 7, and after synchronizing engine and transmission input speed to zero at step 112, the input brake 11 is once again engaged. Speed and acceleration of the traction motor 16 can be automatically controlled, with compensation for inertia torque provided as needed by the other motor, i.e., traction motor 18. With the input brake 11 fully engaged, the method 100 proceeds to step 116.

At step 116, the motor torque from traction motors 16 and 18 are ramped as needed to provide the required motor output torque. The transmission 14 is now in EV2, and the method 100 is finished.

As a summary of the EV transition of method 100 outlined above, the vehicle 10 is initially traveling at low speed in EV1. In order to shift into the desired EV2 state, the input brake 11 is first released into a first transitional state. Engine speed is then increased through this first transitional state in order to reach an engine-on EVT state, i.e., EVT1, at an optimal engine speed. Thereafter, by transitioning through multiple torque and speed control phases, the transmission 14 transfers through the predetermined fixed gear state, such as FG2, and reaches an additional engine-on operating state, or EVT2, with a desired engine speed.

The engine 12 is then ramped down to zero, and the input brake 11 is engaged when slip across the brake is close to zero. During this entire EV1-to-EV2 mode transition, the engine speed slews from zero to an FG2 synchronous speed and then back to zero, and the engine is not fueled (i.e., off, but possibly rotating). The method 100 proceeds as explained above unless a shift abort is commanded during the mode transition as a result of a driver-torque induced engine on or another engine auto-start condition, e.g., low battery state of charge or high motor temperature.

Referring to FIG. 4, the reverse transition is explained via method 200, i.e., an EV mode transition moving from EV2 back to EV1. At step 202, or stage 1, the input brake 11 is unloaded at a calibrated ramp rate, and at step 204 (stage 2) the input brake is released. Engine speed is at zero during the release of the input brake 11. With input brake 11 disengaged, the method 200 proceeds to step 206.

At step 206, or stage 3, the speed of the traction motor 16 is synchronized to zero, i.e., the slip across the second clutch 17 is controlled below a threshold. At step 208, or stage 4, the second clutch 17 is engaged. The method 200 proceeds to step 210.

Step 210, or stage 5, includes releasing the third clutch 19, and step 212 (stage 6) includes controlling engine speed to zero, i.e., until slip across the input brake 11 is less than a calibrated low limit. At step 214, or stage 7, the torque of the traction motor 16 is ramped to zero and the input brake 11 is engaged once again. Output torque may be maintained using output torque from the traction motor 18, with the input brake 11 unloaded. The transmission 14 is now in the first EV mode (EV1), and the method 200 is finished.

Figure 5:
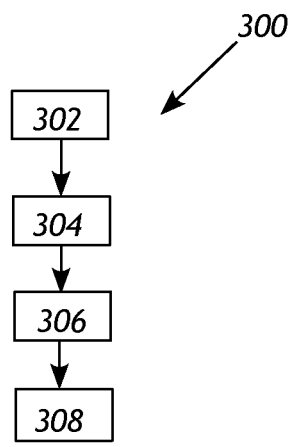
FIG. 5 is a flow chart describing an EV to an engine-on electrically-variable transmission (EVT) mode transition.

Referring to FIG. 5, another EV mode transition that is selectable by the control system 40 according to the present method 80 (see FIG. 2) is a mode shift or transition from the second EV mode (EV2) to the second EVT mode (EVT2), i.e., method 300. This occurs with an engine start event above a threshold vehicle speed, or another engine auto-start condition, e.g., a driver-torque induced event, a low battery state of charge, or a high motor temperature, while operating in EV2.

Beginning with step 302, and while operating in EV2, the input brake 11 is first unloaded at a calibrated ramp rate, the torque of the traction motor 16 is ramped to zero. The method 300 proceeds to step 304, wherein the input brake 11 is released when engine speed is approximately zero. At step 306, the engine 12 is then cranked to a calibrated fueling speed, and then engine is fueled and fired. The method 300 then proceeds to step 308, with the transmission 14 now in EVT2, wherein engine torque/speed is controlled to desired values using the control system 40. The method 300 is finished.

Figure 6:
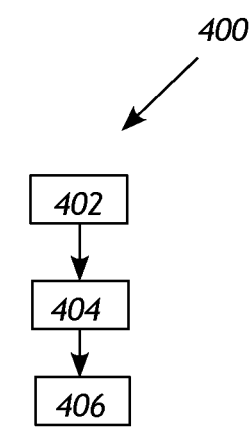
FIG. 6 is a flow chart describing an EVT-to-EV mode transition.

Referring to FIG. 6, the mode transition of shifting back from EVT2 to EV2 can be achieved via method 400. At step 402, engine torque is ramped to zero, while engine speed is controlled toward zero through the speed phase. At step 404, engine fueling is turned off when the engine speed is below a calibrated fueling speed. The torque output of the traction motors 16 and/or 18 is adjusted by the control system 40, e.g., via motor control processors thereof, so as to maintain the output torque at a desired level. Slip across the input brake 11 is then controlled until it is less than a calibrated slip limit, and the method 400 proceeds to step 406. At step 406, the input brake 11 is fully engaged. The transmission 14 is then in the second EV mode, i.e., EV2. The method 400 is finished once EV2 is reached.

Figure 7:
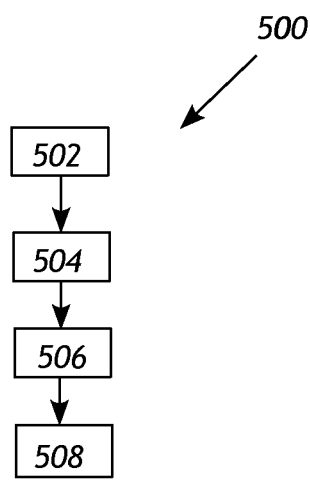
FIG. 7 is a flow chart describing another EV-to-EVT mode transition.

Referring to FIG. 7, another EV mode transition is transition from EV1 to EVT1, i.e., an engine start event occurring when the vehicle 10 is operating in EV1. This can be achieved via method 500. At step 502 of method 500, torque from the traction motor 16 is ramped to zero, and the input brake 11 is unloaded. The method 500 proceeds to step 504, wherein the input brake 11 is released. Engine speed is at zero when this occurs. At step 506, the engine 12 is cranked to a calibrated fueling speed, and the method 500 proceeds to step 508. At step 508, the engine 12 is fueled and fired, and engine torque/speed is thereafter controlled to a desired value. The transmission 14 is now in the first EV mode, i.e., EVT1, and the method 500 is finished.

Figure 8:
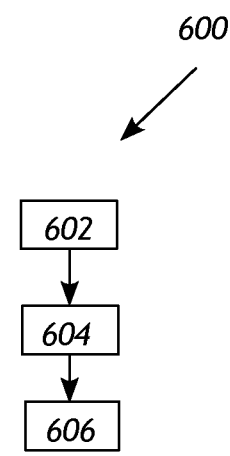
FIG. 8 is a flow chart describing another EVT-to-EV mode transition.

Referring to FIG. 8, another EV mode transition controllable via the method 80 of FIG. 2 is a transition from EVT1 back to EV1, i.e., executing an engine stop event while the vehicle 10 is operating in EVT1. This can be achieved via method 600. At step 602, the speed of traction motor 16 is ramped to zero while fuel feed to the engine 12 is discontinued. The method 600 then proceeds to step 604. At step 604, torque from the traction motors 16 and 18 is controlled to hold the output from the motors at a desired level. Slip across the input brake 11 is less than a threshold. Once this is achieved, the method 600 proceeds to step 606, wherein the input brake 11 is once engaged. The transmission 14 is now in EV1, and the method 600 is finished.

Referring back to FIG. 1, the optional one-way clutch 111 can be used in lieu of the input brake 11 as noted above, with some minor variation in its manner of use. During the torque phase of clutch unloading, torque from the fraction motor 16 is ramped down to zero, and the one-way clutch 111 is automatically unloaded. The input brake 11 by way of contrast requires control action on the part of the control system 40. Afterward, the engine 12 is controlled to a desired speed through the speed phase using both of the traction motors 16 and 18.

Before the torque phase of loading up the one-way clutch 111, the slip across the one-way clutch is brought close to zero through the speed phase of control by both motors 16 and 18. Then, during the torque phase of loading up the one-way clutch 111, the traction motor 16 in EVT1 or the traction motor 18 in EVT2 will gradually reverse the input torque to automatically load the one-way clutch 111.

Using the control system 40 to control the input clutch 11 during EV mode transitions as set forth above, two-mode EV propulsion is enabled with enhanced EV drive capabilities. Electric-motor assisted, synchronous mode transition control between two EV modes, i.e., EV1 and EV2, is enabled by passing the multiple torque and speed phases, with motor off-loading of the various clutches during the torque phases and motor-assisted synchronization during the various speed phases of control. Near-zero clutch slip energy is generated during the torque phase with the zero-slip clutch slip improving shift quality. Thus, transitions from EV1 to EV2, EV2 to EV1, EV1 to EVT1, EVT1 to EV1, EV2 to EVT2, and EVT2 to EV2 are fully enabled.

Additionally, control system 40 is configured to automatically abort the EV mode transition in response to a threshold condition. Such conditions may include, but are not limited to, a threshold requested output torque or an engine auto-start condition such as low battery state of charge or high motor temperature. The control system 40 is further configured to automatically transition to a commanded engine-on or engine-off range state after aborting the EV mode transition. That is, although certain transitions such as an EV1-to-EV2 transition are relatively complex, the present shift execution logic of method 80 and its constituent methods 100 and 200 allows the mode transition to be aborted at any moment during the transition in response to changing conditions. The control system 40 can transition to any possible engine-on or engine-off range state requested by any power management optimization algorithms of the control system 40, and/or as commanded by any shift sequencing logic.

As noted above, the EV1-to-EV2 shift is relatively lengthy and complex, and may be implemented only with proper shift abort strategies that are configured to handle drastically changing output torque requests in the middle of the EV mode transition. Note that in EV1, a desired transition to EV2 requires a release of input brake 11, with the engine 12 starting to spin up upon release. If a driver then decides to transition to a high-torque state requiring use of the engine 12, the input brake 11 has already been released in the first torque phase. From this point on, the control system 40 can reach any desired EVT state or fixed gear state.

While the best modes for carrying out the invention have been described in detail, those familiar with the art to which this invention relates will recognize various alternative designs and embodiments for practicing the invention within the scope of the appended claims.

The invention claimed is:

1. A method of executing an electric-only (EV) mode transition in a vehicle having a control system, a powertrain with an engine, an input brake for grounding the engine, a first and a second electric traction motor, and a transmission, wherein the transmission includes an output member that is driven via the traction motors in a first and a second electric vehicle (EV) operating mode, the method comprising:
   determining a set of vehicle operating values prior to the EV mode transition using the control system;
   processing the set of vehicle operating values to thereby identify when the EV mode transition is imminent; and
   executing a transition to or from the first or the second EV operating mode as the EV mode transition by selectively engaging and disengaging the input brake via the control system, and by using the at least one of the first and the second traction motors to synchronize slip across the input brake during the EV mode transition.

2. The method of claim 1, wherein the EV mode transition is a transition from the first EV operating mode to the second EV operating mode, the method further comprising:
   transitioning between the first and the second EV operating modes using multiple speed and torque control phases to thereby enter multiple intermediate operating modes.

3. The method of claim 2, wherein the multiple intermediate operating modes include a pair of engine-on electrically-variable transmission modes and a fixed gear mode.

4. The method of claim 1, further comprising:
reducing speed of the first traction motor to zero;
unloading and releasing the input brake;
synchronizing the speed of the first traction motor with an output speed of a rotating clutch positioned between a first and a second planetary gear set of the transmission, wherein an additional brake connects the second planetary gear set to a stationary member;
engaging the rotating clutch to connect a member of the first planetary gear set with a member of the second planetary gear set;
releasing the additional brake to thereby disconnect the member of the second gear set from the stationary member;
synchronizing engine speed with an output speed of the input brake; and
engaging the input brake.

5. The method of claim 4, further comprising:
controlling the output torque of each of the first and the second traction motors to achieve a threshold output torque.

6. The method of claim 1, wherein the input brake is one of an actively-actuated friction clutch and a passively-actuated one-way clutch.

7. The method of claim 1, further comprising:
releasing the input brake when the engine speed is zero;
cranking the engine to a threshold fueling speed; and
controlling, as the EV mode transition, engine speed and engine torque using the control system to thereby reach an engine-on electrically variable transmission mode from one of the EV operating modes.

8. The method of claim 1, further comprising:
automatically aborting the EV mode transition in response to a threshold condition.

9. The method of claim 8, further comprising:
automatically transitioning to a commanded engine-on or engine-off range state after aborting the EV mode transition.

10. A vehicle comprising:
an engine;
an input brake for grounding the engine;
a first and a second electric traction motor;
a transmission having an output member that is driven via the traction motors in a first and a second electric-only (EV) operating mode; and
a control system configured for optimizing an EV operating mode transition by controlling the input brake and the first and second traction motors, wherein the control system is configured for:
determining a set of vehicle operating values prior to the EV mode transition using a control system;
processing the vehicle operating values to thereby identify when the EV mode transition is imminent; and
executing a transition to or from the first or second EV operating mode as the EV mode transition by selectively engaging and disengaging the input brake, and by using the at least one of the first and the second traction motors to synchronize slip across the input brake during the EV mode transition.

11. The vehicle of claim 10, wherein the EV mode transition is a transition from the first EV operating mode to the second EV operating mode, and wherein the control system is configured for transitioning between the first and the second EV operating modes using multiple speed and torque control phases to thereby enter multiple intermediate non-EV operating modes.

12. The vehicle of claim 11, wherein the multiple intermediate non-EV operating modes include a pair of engine-on electrically-variable transmission modes and a fixed gear mode.

13. The vehicle of claim 10, wherein the control system is further configured for:
reducing a speed of the first traction motor to zero;
unloading and releasing the input brake;
synchronizing the speed of the first traction motor with an output speed of a rotating clutch positioned between a first and a second planetary gear set of the transmission, wherein an additional brake connects the second planetary gear set to a stationary member;
engaging the rotating clutch to connect a member of the first planetary gear set with a member of the second planetary gear set;
releasing the additional brake to thereby disconnect the member of the second gear set from the stationary member;
synchronizing engine speed with an output speed of the input brake; and
engaging the input brake.

14. The vehicle of claim 13, wherein the control system automatically controls the output torque of each of the first and the second traction motors to achieve a threshold output torque.

15. The vehicle of claim 10, wherein the input brake is one of an actively-actuated friction clutch and a passively-actuated one-way clutch.

16. The vehicle of claim 10, wherein the control system is further configured for:
releasing the input brake when the engine speed is zero;
cranking the engine to a threshold fueling speed; and
controlling, as the EV mode transition, engine speed and engine torque using the control system to thereby reach an engine-on electrically variable transmission mode from one of the EV operating modes.

17. The vehicle of claim 10, wherein the control system is further configured for automatically aborting the EV mode transition in response to a threshold condition.

18. The vehicle of claim 10, wherein the control system is further configured for automatically transitioning to a commanded engine-on or engine-off range state after aborting the EV mode transition.

* * * * *